(12) United States Patent
Wang et al.

(10) Patent No.: US 11,499,427 B2
(45) Date of Patent: Nov. 15, 2022

(54) TUNNEL ADAPTIVE LINING STRUCTURE IN COMPLEX ENVIRONMENT AND CONSTRUCTION METHOD THEREOF

(71) Applicant: China Institute of Water Resources and Hydropower Research, Beijing (CN)

(72) Inventors: Xiaogang Wang, Beijing (CN); Lipeng Liu, Beijing (CN); Xingsong Sun, Beijing (CN); Ruizhi Fu, Beijing (CN); Yongyu Ling, Beijing (CN); Yujie Wang, Beijing (CN); Yufei Zhao, Beijing (CN); Qingwei Duan, Beijing (CN); Xingchao Lin, Beijing (CN); Long Jiang, Beijing (CN); Ruilang Cao, Beijing (CN); Qiang Zhang, Beijing (CN); Ping Sun, Beijing (CN); Jin Pi, Beijing (CN)

(73) Assignee: CHINA INSTITUTE OF WATER RESOURCES AND HYDROPOWER RESEARCH, Beijing (CN)

(*) Notice: Subject to any disclaimer, the term of this patent is extended or adjusted under 35 U.S.C. 154(b) by 11 days.

(21) Appl. No.: 17/158,720

(22) Filed: Jan. 26, 2021

(65) Prior Publication Data
US 2022/0120183 A1    Apr. 21, 2022

(30) Foreign Application Priority Data
Oct. 21, 2020    (CN) .......................... 202011132887.1

(51) Int. Cl.
*E21D 11/38*    (2006.01)
*E21F 16/02*    (2006.01)

(52) U.S. Cl.
CPC ............ *E21F 16/02* (2013.01); *E21D 11/386* (2016.01)

(58) Field of Classification Search
CPC ........ E21F 16/02; E21D 11/386; E21D 11/10; E21D 11/15; Y10T 29/49879
See application file for complete search history.

(56) References Cited

U.S. PATENT DOCUMENTS 551,042 A * 12/1895 McDonald .............. E21D 11/10
299/61
1,716,125 A * 6/1929 Hackley .................. E21D 11/10
405/150.1

(Continued)

*Primary Examiner* — Edwin J Toledo-Duran
(74) *Attorney, Agent, or Firm* — Bayramoglu Law Offices LLC

(57) ABSTRACT

The disclosure discloses an adaptive lining structure of a tunnel in complex environment and a construction method thereof, and relates to the technical field of tunnel construction, comprising a lining, a pressure regulating layer and a connecting cylinder; wherein the pressure regulating layer is provided between the lining and a surrounding rock; and the connecting cylinder is provided in the tunnel and runs through the top of the lining. The adaptive lining structure of a tunnel in complex environment and the construction method in the disclosure are simple in structure, reasonable in design and convenient for efficient construction; it can deal with engineering problems such as lining cracking caused by high internal water and high external water in the tunnel, and can ensure the safety of tunnel lining in different periods.

10 Claims, 5 Drawing Sheets

(56) References Cited

U.S. PATENT DOCUMENTS

| | | | | |
|---|---|---|---|---|
| 2,096,850 | A * | 10/1937 | Forsberg | E21D 11/15 249/11 |
| 2,196,874 | A * | 4/1940 | Ruegg | B28B 3/022 425/432 |
| 2,568,010 | A * | 9/1951 | Kieser | E02B 9/06 405/150.1 |
| 3,169,376 | A * | 2/1965 | Cunningham | E21D 9/005 405/150.1 |
| 3,404,638 | A * | 10/1968 | Edwards | B61D 3/16 104/138.1 |
| 3,522,773 | A * | 8/1970 | Edwards | B61D 3/16 105/396 |
| 3,601,354 | A * | 8/1971 | Rogers | E04G 9/05 249/47 |
| 3,750,407 | A * | 8/1973 | Heierli | E21D 11/157 405/138 |
| 3,954,064 | A * | 5/1976 | Minovitch | H01F 7/0236 104/130.02 |
| 4,003,211 | A * | 1/1977 | Klapdor | E21D 9/0635 52/310 |
| 4,557,627 | A * | 12/1985 | Schmid | E21D 9/0635 405/145 |
| 5,141,363 | A * | 8/1992 | Stephens | C04B 28/02 405/150.2 |
| 5,928,447 | A * | 7/1999 | GianFrancisco | F16L 55/162 264/36.16 |
| 10,228,087 | B2 * | 3/2019 | Okuda | F16L 55/1656 |
| 2015/0125215 | A1 * | 5/2015 | Dalegarden | E21F 16/02 405/152 |
| 2017/0314721 | A1 * | 11/2017 | Okuda | F16L 55/1645 |

* cited by examiner

TUNNEL ADAPTIVE LINING STRUCTURE IN COMPLEX ENVIRONMENT AND CONSTRUCTION METHOD THEREOF

CROSS REFERENCE TO RELATED APPLICATIONS

The application claims priority to Chinese Application No. 202011132887.1, filed on Oct. 21, 2020, which is hereby incorporated by reference in its entirety.

TECHNICAL FIELD

The disclosure relate to the technical field of tunnel construction, in particular to a tunnel adaptive lining structure in complex environment and a construction method thereof.

BACKGROUND

A hydraulic tunnel is an important part of conventional hydropower stations, pumped storage power stations and long-distance water conveyance projects. Whether the lining structure design is reasonable is related to the success or failure of the whole project. Hydropower stations, especially pumped storage power stations, generally have high internal water pressure in water conveyance tunnels in order to meet the water head required for power generation. For example, the maximum internal water head of the diversion tunnel of Yangjiang Pumped Storage Power Station under construction in China reaches 800 m. At the same time, these projects are located in deep buried strata, and are also faced with high external water pressure in the occurrence environment. For example, after the water conveyance tunnel of Jinping Level-Two Hydropower Station in China is blocked for nearly 5 km, the average groundwater pressure for many years is measured to be 10.22 MPa; the external water pressure of the diversion tunnel of Tianshengqiao Level-Two Hydropower Station is measured to be 3 to 4 MPa. At the same time, there are inevitable weak strata, local faults and high geothermal tunnel sections in the stratum through which the long-distance and large-depth water conveyance tunnel passes. With the long-term operation of the project, the underground water level accumulates and the water head rises in the rock mass. These projects are bound to face high internal water, high external water pressure and even high internal and external water alternation during the operation period and unloading maintenance period, which poses a great challenge to the rational design of lining and structural safety. In addition, the loads caused by creep deformation of the surrounding rock and dislocation deformation of faults will seriously threaten the safety of lining during long-term operation. During the long-term operation period, the high geothermal surrounding rock is conducted, so that the lining has the inside and outside differences in temperature, which is easy to cause temperature difference stress, leading to the cracking and damage of the lining, and then losing the original function of the lining.

At present, the main types of hydraulic tunnel lining comprise reinforced concrete lining, steel lining and prestressed lining. These structure types can deal with simple high internal water or high external water pressure operating environment, but there are still many insurmountable problems when dealing with high internal and external water alternation, such as the transition stage between operation period and unloading period. At the same time, the long-term creep deformation load of the surrounding rock and the temperature load of the high geothermal surrounding rock are not considered enough, which cannot deal with the security threat of weak stratum and high geothermal surrounding rock to lining.

SUMMARY

To solve the above technical problems, the disclosure provides a tunnel adaptive lining structure in complex environment and a construction method thereof, so as to solve the safety problem of the concrete lining structure under high internal water pressure, high external water pressure, large convergence deformation of the surrounding rock with high ground stress and high geothermal environment, so that the lining is in an internal and external compression state, giving full play to the advantage of high compressive strength, and avoiding problems such as concrete cracking resulted from tensile stress in the lining caused by uneven stress on the internal and external walls.

To achieve the above object, the disclosure provides the following solution.

The disclosure provide a tunnel adaptive lining structure in complex environment and a construction method thereof, comprising a lining, a pressure regulating layer and a connecting cylinder; wherein the pressure regulating layer is provided between the lining and a surrounding rock; and the connecting cylinder is provided in the tunnel and runs through the top of the lining.

Preferably, the pressure regulating layer comprises a plurality of pressure regulating chambers, and adjacent pressure regulating chambers are communicated with each other through connecting pipes of the pressure regulating chambers; the outer side of the pressure regulating chamber is in contact with the surrounding rock, and the inner side of the pressure regulating chamber is connected with the outer wall of the lining.

Preferably, the pressure regulating chamber is made of flexible high-pressure resistant material.

Preferably, the connecting cylinder is communicated with the pressure regulating layer through an internal water connecting pipe.

Preferably, two one-way valves are provided in the connecting cylinder, and the two one-way valves are provided in opposite directions; the upper ends of the two one-way valves are communicated with each other through a first branch pipe, and the first branch pipe is communicated with the internal water connecting pipe.

Preferably, a water collecting port is provided at the top of the connecting cylinder, and the water collecting port is communicated with the surrounding rock.

Preferably, a one-way valve is provided in the connecting cylinder, and the one-way valve is used for communicating the interior of the lining with the surrounding rock.

The disclosure further discloses a construction method of the tunnel adaptive lining structure in complex environment, comprising the steps of:

step 1, making pressure regulating chambers with corresponding sizes according to the size of a tunnel, so that the pressure regulating layer consisted of a plurality of pressure regulating chambers covers the inner surface of the surrounding rock;

step 2, fixing the pressure regulating chamber on the surrounding rock of the tunnel, and connecting the connecting pipes of the pressure regulating chambers with each other;

step 3, installing and fixing the connecting cylinder between the top two pressure regulating chambers;

step 4: repeating the above steps 2 and 3, and installing a plurality of circles of pressure regulating chambers according to the length requirements;

step 5: regulating the pressure value of the one-way valve and installing;

step 6, pouring the lining and finishing.

Compared with the prior art, the disclosure has the following technical effects.

The tunnel adaptive lining structure in complex environment and the construction method thereof in the disclosure are simple in structure, reasonable in design and convenient for efficient construction; it can deal with engineering problems such as lining cracking caused by high internal water and high external water in the tunnel, and can ensure the safety of tunnel lining in different periods; it not only enriches the structural types of hydraulic tunnel lining at present, but also effectively solves the problem that it is difficult to design the hydraulic high-pressure tunnel lining. At the same time, it has important application value and broad application prospect.

BRIEF DESCRIPTION OF THE DRAWINGS

In order to explain the embodiments of the disclosure or the technical solution in the prior art more clearly, the drawings needed in the embodiments will be briefly introduced hereinafter. Obviously, the drawings in the following description are only some embodiments of the disclosure, and for those skilled in the art, other drawings can be obtained according to these drawings without paying creative labor.

Figure 1:
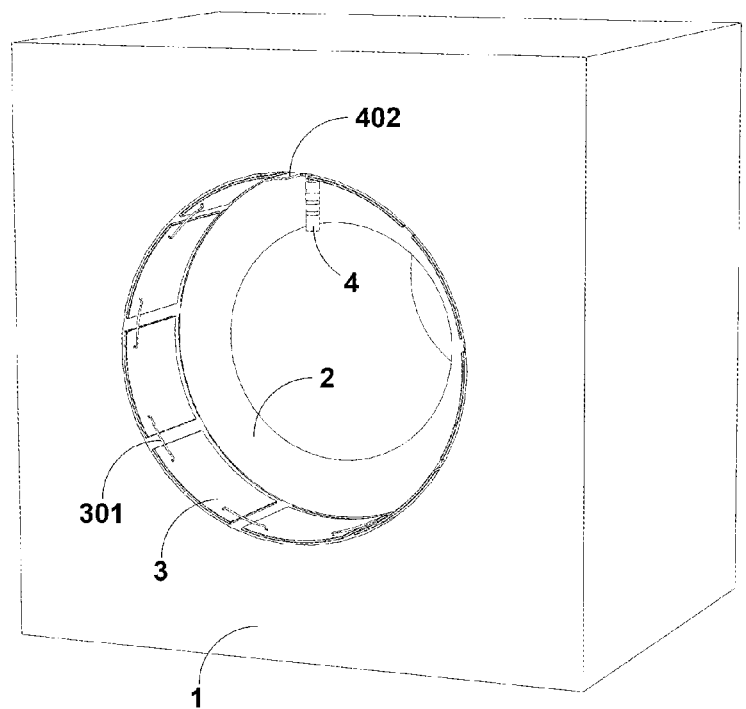
FIG. 1 is an overall sectional diagram of a lining structure according to the disclosure.
Figure 2:
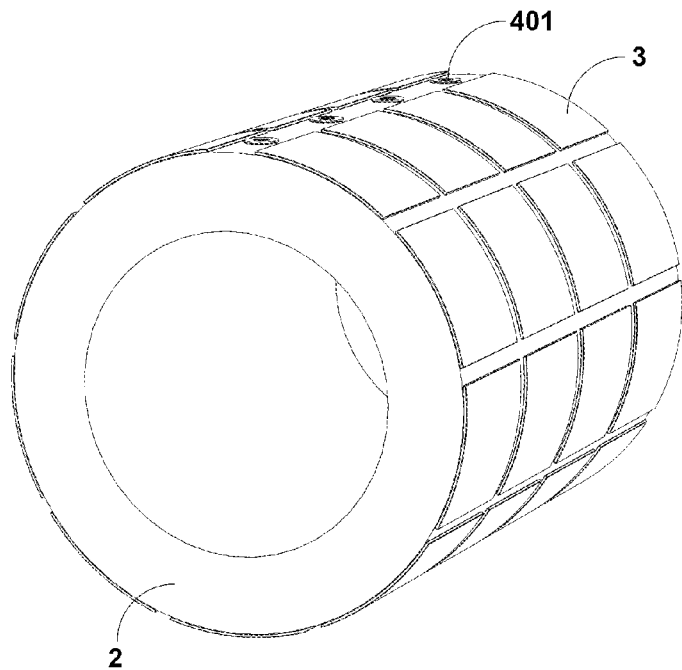
FIG. 2 is a schematic diagram of the arrangement of a pressure regulating chamber according to the disclosure.
Figure 3:
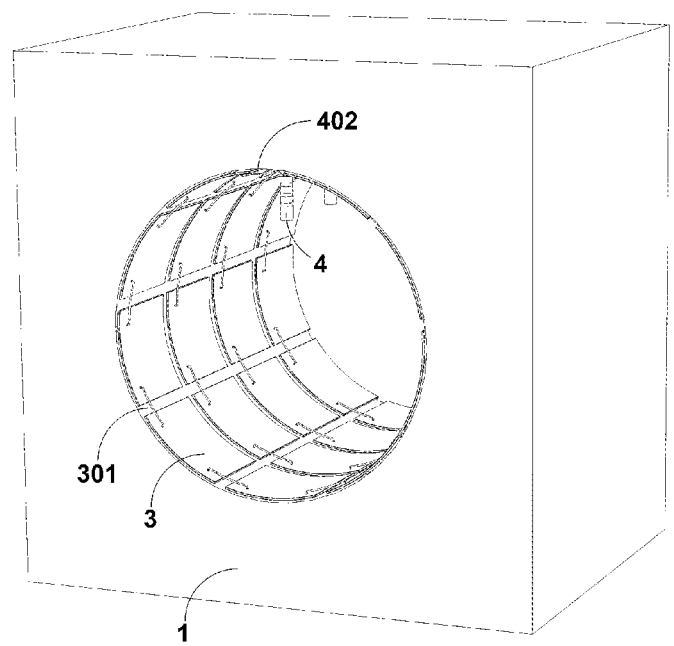
FIG. 3 is a schematic diagram of the lining structure arranged along the surrounding rock according to the disclosure.
Figure 4:
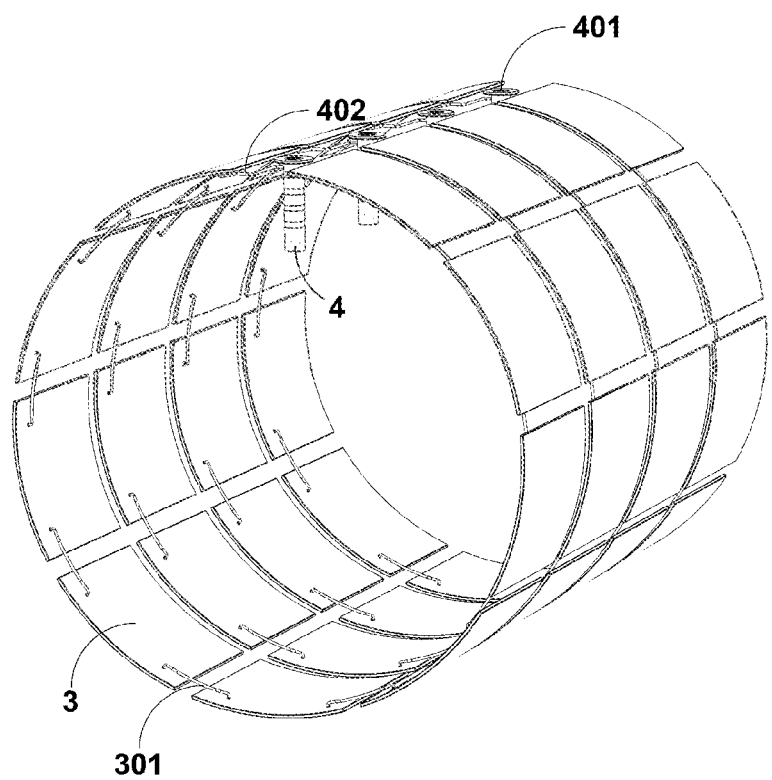
FIG. 4 is a schematic diagram of the structure of a pressure regulating chamber according to the disclosure.
Figure 5:
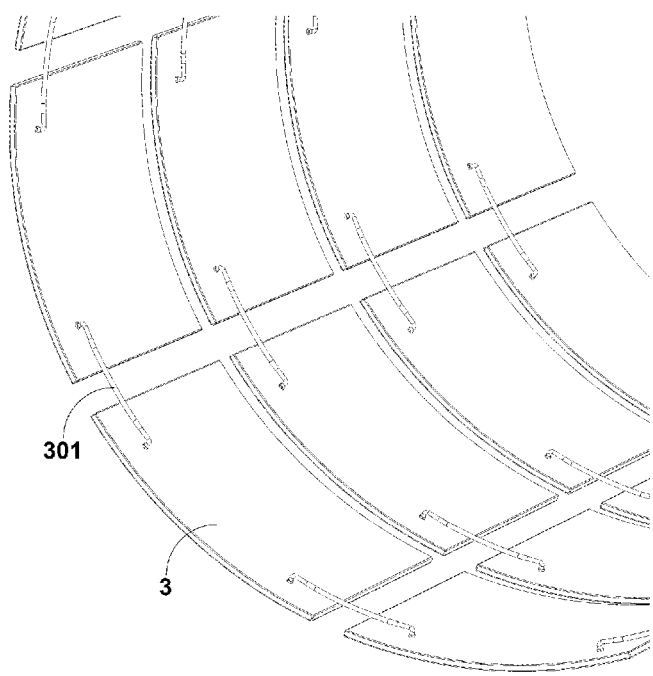
FIG. 5 is a schematic diagram of the connection structure of a pressure regulating chamber according to the disclosure.
Figure 6:
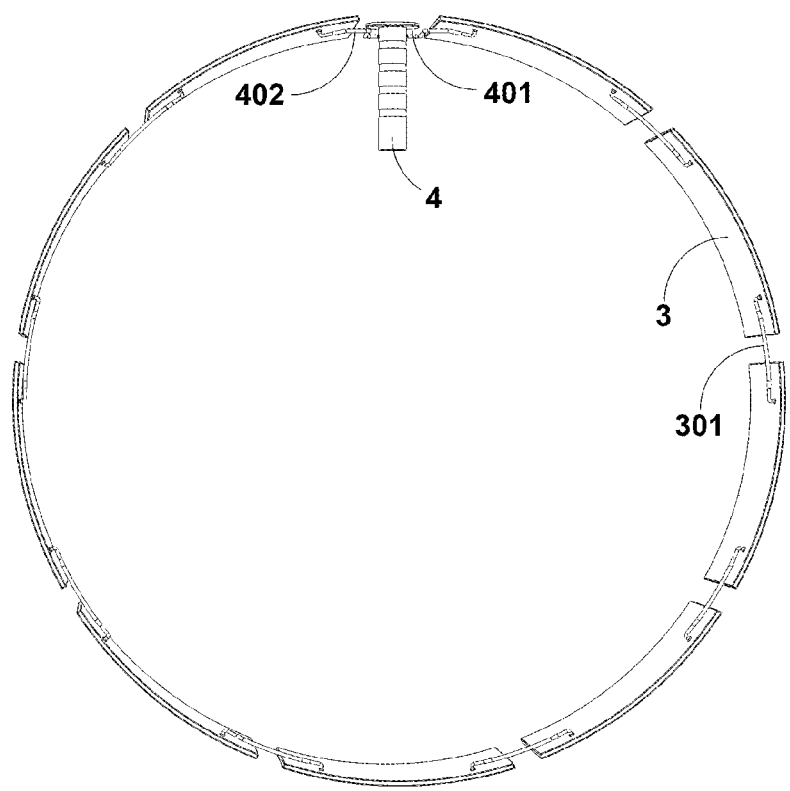
FIG. 6 is a schematic diagram of the integral connection of a pressure regulating chamber according to the disclosure.
Figure 7:
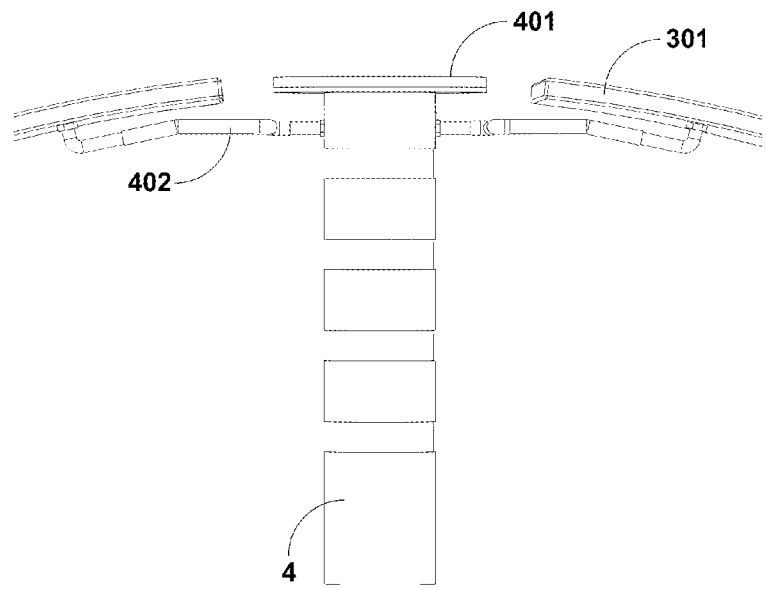
FIG. 7 is a schematic diagram of a connecting cylinder according to the disclosure.

In the figures, 1—surrounding rock; 2—lining; 3—pressure regulating chamber; 301—connecting pipe of a pressure regulating chamber; 4—connecting cylinder; 401—water collecting port; 402—internal water connecting pipe; 403—connecting cylinder mounting plate; 5—one-way valve.

DESCRIPTION OF THE EMBODIMENTS

The technical solution in the embodiments of the disclosure will be described clearly and completely with reference to the drawings in the embodiments of the disclosure. Obviously, the described embodiments are only some embodiments of the disclosure, rather than all of the embodiments. Based on the embodiments of the disclosure, all other embodiments obtained by those skilled in the art without paying creative labor belong to the scope of protection of the disclosure.

Embodiment 1

As shown in FIGS. 1 to 10, this embodiment provides a tunnel adaptive lining structure in complex environment, comprising a lining 2, a pressure regulating layer and a connecting cylinder 4; wherein the pressure regulating layer is provided between the lining 2 and a surrounding rock 1; and the connecting cylinder 4 is provided in the tunnel and runs through the top of the lining 2.

In this specific embodiment, the pressure regulating layer comprises a plurality of pressure regulating chambers 3, which are made of flexible high-pressure resistant material, such as butyl rubber, ethylene propylene diene monomer rubber, polyether rubber, nylon, ABS, etc. With the water entering the tunnel, the water pressure increases, which can deform and coordinate to convey the water pressure to the inner wall of the surrounding rock 1 and the outer wall of the lining 2 uniformly.

Adjacent pressure regulating chambers 3 are communicated with each other through connecting pipes 301 of the pressure regulating chambers to form an annular pressure regulating layer, the outer side of the pressure regulating chamber 3 is in contact with the surrounding rock 1, and the inner side of the pressure regulating chamber 3 is connected with the outer wall of the lining 2. When laying, a corresponding number of pressure regulating chambers 3 can be laid according to the length, so as to adapt to tunnels of different sizes and cover the outer surface of the lining 2 as much as possible.

The connecting cylinder 4 is communicated with the pressure regulating layer through an internal water connecting pipe 402.

Two one-way valves 5 are provided in the connecting cylinder 4, and the two one-way valves 5 are provided in opposite directions; the upper ends of the two one-way valves 5 are communicated with each other through a first branch pipe, and the first branch pipe is communicated with the internal water connecting pipe 402. The set pressures of the two one-way valves 5 can be adjusted independently. When the difference between the internal water pressure in the tunnel and the internal water pressure in the pressure regulating chamber 3 is greater than the set value of the one-way valve 5, the internal water in the tunnel or the internal water in the pressure regulating chamber 3 will flow to the end with lower pressure through the one-way valve 5, so as to maintain the internal water pressure in the tunnel and the internal water pressure in the pressure regulating chamber 3 within a certain pressure difference range, avoiding the damage of the lining 2 caused by large pressure difference between inner and outer walls of the lining 2. The positive and negative one-way valves 5 are connected with the internal water in the tunnel, so as to achieve the effect of balancing the water pressure acting on inner and outer walls of the lining 2.

When the difference between the internal water pressure in the tunnel and the internal water pressure in the pressure regulating chamber 3 is greater than the set value of the one-way valve 5, the internal water in the tunnel or the internal water in the pressure regulating chamber 3 will flow to the end with lower pressure through the one-way valve 5, so as to maintain the internal water pressure in the tunnel and the internal water pressure in the pressure regulating chamber 3 within a certain pressure difference range, avoiding the damage of the lining 2 caused by large pressure difference between inner and outer walls of the lining 2.

Embodiment 2

This embodiment is an improved embodiment based on Embodiment 1.

Figure 8:
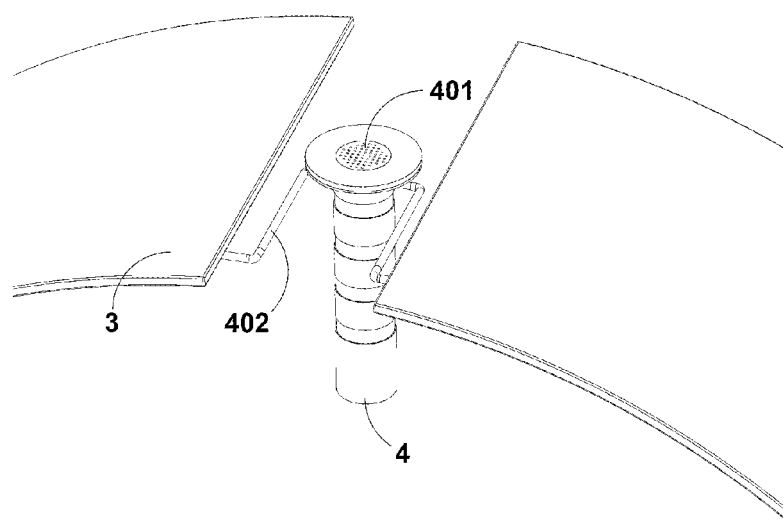
FIG. 8 is an external detail diagram of a connecting cylinder according to the disclosure.
Figure 9:
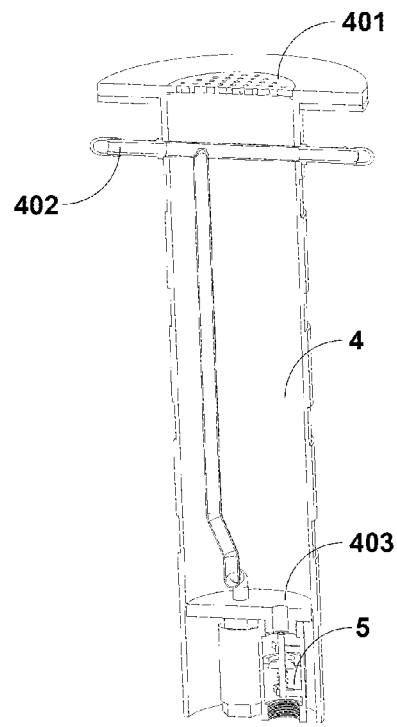
FIG. 9 is an internal detailed diagram of a connecting cylinder according to the disclosure.
Figure 10:
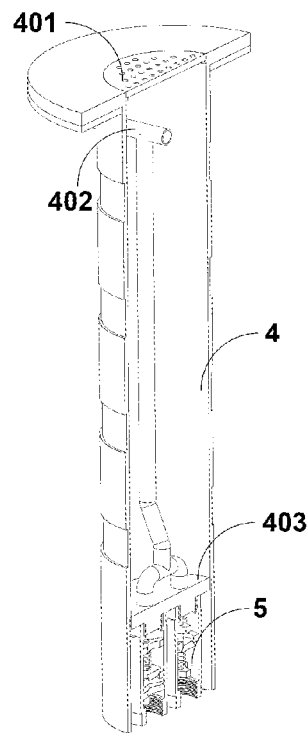
FIG. 10 is a schematic diagram of the connection of a one-way valve according to the disclosure.

As shown in FIGS. 8 and 9, in this embodiment, a water collecting port 401 is provided at the top of the connecting cylinder 4, and the water collecting port 401 is communicated with the surrounding rock 1. A grid plate is provided at the water collecting port 401. A one-way valve 5 is provided in the connecting cylinder 4, and the one-way valve 5 is used for communicating the interior of the lining 2 with the surrounding rock 1. When the difference between the groundwater pressure outside the lining 2 and the internal water pressure in the tunnel is greater than the pressure set value of the one-way valve 5, the groundwater will flow into the tunnel through the one-way valve 5, thus reducing the water pressure acting on the outer surface of the lining 2.

Embodiment 3

This embodiment is an improved embodiment based on Embodiment 1.

In this embodiment, a connecting cylinder mounting plate 403 is provided in the connecting cylinder 4. One side of the connecting cylinder mounting plate 403 is communicated with the internal water connecting pipe 402, and the other end is communicated with a plurality of one-way valves 5, respectively, so as to facilitate the installation and replacement of the one-way valves 5.

Embodiment 4

The embodiment discloses a construction method of the tunnel adaptive lining structure in complex environment, comprising the steps of:

step 1, making pressure regulating chambers 3 with corresponding sizes according to the size of a tunnel, so that the pressure regulating layer consisted of a plurality of pressure regulating chambers 3 covers the inner surface of the surrounding rock 1;

step 2, fixing the pressure regulating chamber 3 on the surrounding rock 1 of the tunnel, and connecting the connecting pipes 301 of the pressure regulating chambers with each other;

step 3, installing and fixing the connecting cylinder 4 between the top two pressure regulating chambers 3;

step 4: repeating the above steps 2 and 3, and installing a plurality of circles of pressure regulating chambers 3 according to the length requirements;

step 5: regulating the pressure value of the one-way valve 5 and installing;

step 6, pouring the lining 2 and finishing.

It should be noted that it is obvious to those skilled in the art that the disclosure is not limited to the details of the above exemplary embodiments, and that the disclosure can be realized in other specific forms without departing from the spirit or basic characteristics of the disclosure. Therefore, from any point of view, the embodiments should be regarded as exemplary and non-limiting. The scope of the disclosure is defined by the appended claims rather than the above description, so it is intended to include all changes falling within the meaning and scope of the equivalent elements of the claims in the disclosure, and any reference signs in the claims should not be regarded as limiting the claims involved.

In this specification, specific examples are applied to illustrate the principle and implementation of the disclosure, and the explanations of the above embodiments are only used to help understand the method of the disclosure and its core ideas; at the same time, according to the idea of the disclosure, there will be some changes in the specific implementation and application scope for the those skilled in the art. To sum up, the contents of this specification should not be construed as limiting the disclosure.

What is claimed is:

1. A tunnel adaptive lining structure in complex environment, comprising:
    a lining;
    a pressure regulating layer, the pressure regulating layer being provided between the lining and a surrounding rock, the pressure regulating layer comprising a plurality of pressure regulating chambers, the plurality of pressure regulating chambers being spaced from each other such that spaces are formed between the plurality of pressure regulating chambers, and the plurality of pressure regulating chambers in communication with each other via connections;
    a connecting cylinder, wherein the connecting cylinder is within one of the spaces between the plurality of pressure regulating chambers; and
    two one-way valves, the two one-way valves being provided in the connecting cylinder;
    wherein the connections comprise an internal water connecting pipe and a plurality of connecting pipes, wherein the internal water connecting pipe is in communication with two of the plurality of pressure regulating chambers, and the internal water connecting pipe passes through the connecting cylinder, and wherein the plurality of connecting pipes are in communication with the plurality of pressure regulating chambers; and
    wherein the two one-way valves are oriented in opposite directions, an upper end of each of the two one-way valves is in communication with each other through a first branch pipe, and the first branch pipe is in communication with the internal water connecting pipe.

2. The tunnel adaptive lining structure in complex environment according to claim 1,
    wherein an outer side of each of the plurality of pressure regulating chambers is in contact with the surrounding rock, and an inner side of each of the plurality of pressure regulating chambers is connected with an outer wall of the lining.

3. The tunnel adaptive lining structure in complex environment according to claim 2, wherein the plurality of pressure regulating chambers are made of a flexible high-pressure resistant material.

4. The tunnel adaptive lining structure in complex environment according to claim 1, wherein a water collecting port is provided at a top of the connecting cylinder, and the water collecting port is in communication with the surrounding rock.

5. A construction method of the tunnel adaptive lining structure in complex environment according to claim 1, comprising steps of:
    step 1, making the plurality of pressure regulating chambers according to a size of a tunnel, so that the pressure regulating layer comprising the plurality of pressure regulating chambers covers an inner surface of the surrounding rock of the tunnel, wherein the plurality of pressure regulating chambers are configured to be spaced from each other;

step 2, fixing the plurality of pressure regulating chambers on the surrounding rock of the tunnel, and connecting the plurality of pressure regulating chambers with the plurality of connecting pipes;

step 3, installing and fixing the connecting cylinder between the two of the plurality of pressure regulating chambers and having the internal water connecting pipe pass through the connecting cylinder and connect the two of the plurality of pressure regulating chambers to form a circle of pressure regulating chambers;

step 4: repeating the above steps 2 and 3 to install a plurality of circles of pressure regulating chambers according to a length of the tunnel;

step 5: regulating pressure values of the two one-way valves and installing the two one-way valves into the connecting cylinder; and step 6, pouring the lining and finishing.

6. The construction method of the tunnel adaptive lining structure in complex environment according to claim 5, wherein the plurality of pressure regulating chambers are in communication with each other via the connecting pipes; and
wherein an outer side of each of the plurality of pressure regulating chambers is in contact with the surrounding rock, and an inner side of each of the plurality of pressure regulating chambers is connected with an outer wall of the lining.

7. The construction method of the tunnel adaptive lining structure in complex environment according to claim 5, wherein the plurality of pressure regulating chambers are made of a flexible high-pressure resistant material.

8. The construction method of the tunnel adaptive lining structure in complex environment according to claim 5, wherein the connecting cylinder is in communication with the pressure regulating layer through the internal water connecting pipe.

9. The construction method of the tunnel adaptive lining structure in complex environment according to claim 5, wherein a water collecting port is provided at the top of the connecting cylinder, and the water collecting port is in communication with the surrounding rock.

10. The tunnel adaptive lining structure in complex environment according to claim 1, further comprising a connecting cylinder mounting plate, wherein the connecting cylinder mounting plate is provided in the connecting cylinder, and wherein one side of the connecting cylinder mounting plate is in communication with the internal water connecting pipe, and the other end of the connecting cylinder mounting plate is in communication with the two one-way valves.

* * * * *